United States Patent [19]

Liang

[11] Patent Number: 5,407,133
[45] Date of Patent: Apr. 18, 1995

[54] COOLED THIN METAL LINER

[75] Inventor: George P. Liang, Palm City, Fla.

[73] Assignee: United Technologies Corporation, Hartford, Conn.

[21] Appl. No.: 457,063

[22] Filed: Dec. 26, 1989

[51] Int. Cl.⁶ ............................................. F02C 7/18
[52] U.S. Cl. ................................... 239/127.3; 60/757
[58] Field of Search ............ 239/127.1, 127.3, 265.17; 60/262, 264, 265, 266, 271, 752, 754, 755, 756, 757, 758, 759, 760

[56] References Cited

U.S. PATENT DOCUMENTS

| | | | |
|---|---|---|---|
| 2,840,989 | 7/1958 | Macaulay | 60/756 |
| 4,050,241 | 9/1977 | Dubell | 60/757 |
| 4,077,205 | 3/1978 | Pane et al. | 60/757 |
| 4,081,137 | 3/1978 | Sutton et al. | 239/127.3 |
| 4,653,983 | 3/1987 | Vehr | 416/97 |
| 4,700,544 | 10/1987 | Fucci | 60/759 |
| 4,747,543 | 5/1988 | Madden | 239/127.3 |
| 4,773,593 | 9/1988 | Auxier et al. | 239/127.3 |
| 4,800,718 | 1/1989 | Zimmerman | 239/265.17 |
| 4,887,663 | 12/1989 | Auxier et al. | 60/757 |

Primary Examiner—David Brown
Attorney, Agent, or Firm—Edward L. Kochey, Jr.

[57] ABSTRACT

A first metal sheet (34) has openings (46) in registration with depressions (40) in a second contacting metal sheet (36). Each depression has a downstream wall (42) at an angle of 24° from the plane of the sheets. A metering hole (56) in the depression amidst cooling air in a direction to first impinge against an overlaying portion (48) of the first plate, before it diffuses along the downstream wall.

20 Claims, 3 Drawing Sheets

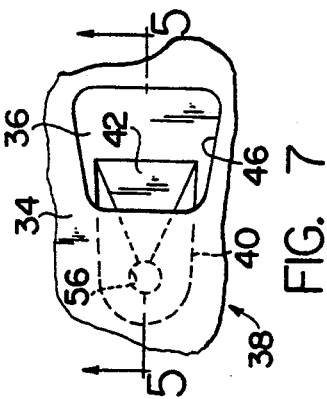
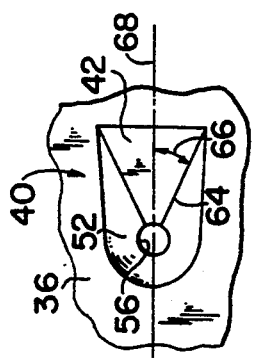
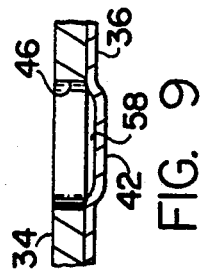
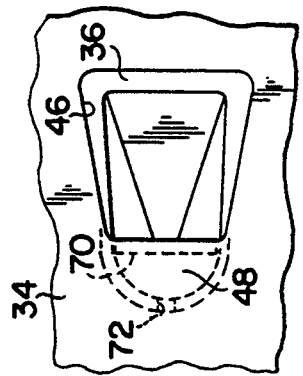
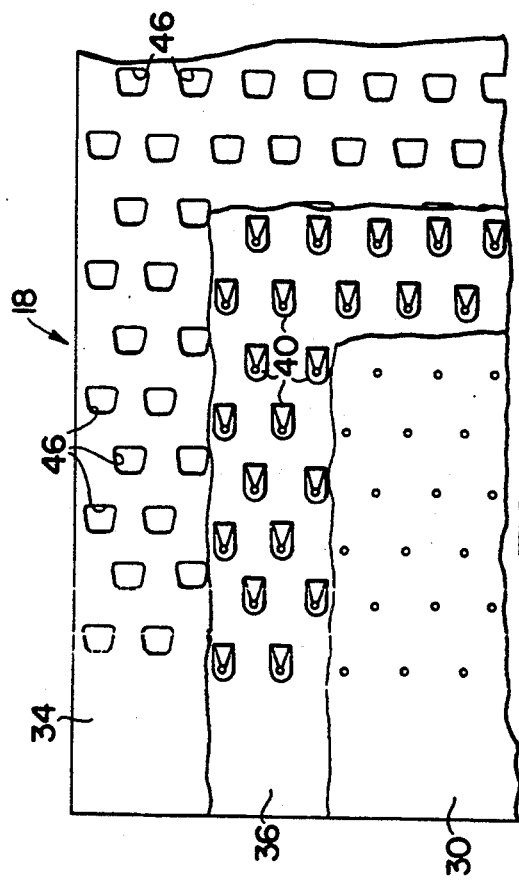
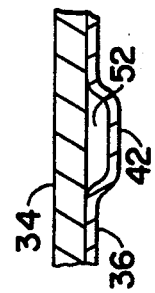
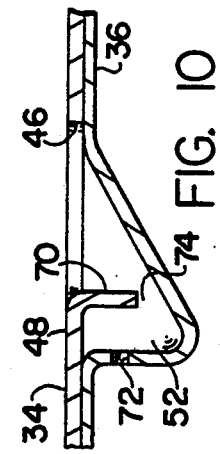
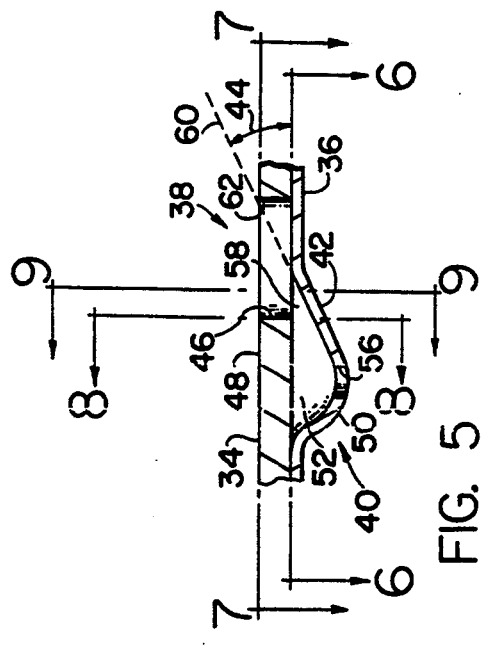

COOLED THIN METAL LINER

The invention described herein was made in the performance of work under NASA Contract No. NAS3-24623 and is subject to the provisions of Section 305 of the National Aeronautics and Space Act of 1958, as amended (42 U.S.C. 2457).

TECHNICAL FIELD

The invention relates to thin metal sheet liners for a hot gas conduit and in particular to an arrangement for cooling the liner.

BACKGROUND OF THE INVENTION

Gas turbine engine discharge nozzles may include variable area flaps. These flaps must tolerate high exhaust gas temperatures on the order of 4500 F during operation. It is conventional to supply a liner and cooling air to protect the underlying structure from the high temperature gases.

While relatively massive liners have been used in the past, attempts also have been made to establish thin metal liners. These have the advantage of lightweight and minimum thermal and pressure stresses due to bending.

Airfoils for a gas turbine engine have a similar problem in operating in a high temperature environment. It has been known to direct cooling air within hollow airfoils and to pass this air through openings in the airfoil to cool the surface. U.S. Pat. No. 4,653,983 shows diffusion openings with an elongated metering hole followed by a three-dimensional diffusion area, all arranged at an angle with the exterior surface. Such openings have been found to be effective in cooling the surface of the gas turbine airfoils.

While the resulting airflow conditions of such airfoils would be desirable in liners, it has not been found possible to locate such openings in thin walls. In U.S. Pat. No. 4,773,593 an arrangement is suggested to emulate such openings. Trapezoidal depressions were placed in the liner with the trapezoid becoming wider in the directional flow, and with the surface of the trapezoid being located at an angle with respect to the plane of the liner of between 5 degrees and 20 degrees. A metering airflow opening was placed at the upstream end of this depression directing airflow onto and along the surface of the depression.

Such an arrangement did lead to improved cooling over the prior art. It, however, seems that the cooling airflow does not sufficiently spread out, and that some of the hot gas is ingested into the depression. This is possibly because of the low static pressure of the relatively high velocity jet immediately downstream of the metering opening.

It is an object of this invention to achieve a diffused flow of cooling air through a thin liner in a manner which achieves increased cooling of the hot surface of the liner.

SUMMARY OF THE INVENTION

The cooled liner is formed of a first and second metal sheet brazed together. A plurality of gas diffusion openings are located in the liner, preferably in a checkerboard pattern.

Each diffusion opening includes a formed depression in the second metal sheet, being depressed away from the first metal sheet which is in contact with the hot gas. A chamber is formed between the sheets with the downstream wall of the depression being at an angle of between 10° and 30° from the plane of the first sheet. An opening in the first sheet is in registration with the downstream wall of the depression, but a portion of the first sheet overlays the upstream portion of the chamber.

A metering hole in the formed depression is located to impinge cool gas passing therethrough against the bounding surface of the chamber, whereby after impingement against this bounding surface it diffuses along the downstream wall passing smoothly into the gas flow path.

BRIEF DESCRIPTION OF THE DRAWINGS

FIG. 4 is a top view of a liner with some layers partially broken away;
FIG. 5 is a side sectional view through a gas diffusion opening;
FIG. 6 is a top view of a depression;
FIG. 7 is a top view of the opening in the gas side metal sheet as it overlays the depression;
FIG. 8 is a section through 9—9 of FIG. 5;
FIG. 9 is a section through 10—10 of FIG. 5;
FIG. 10 is a sectional view through an alternate diffusion opening;
and
FIG. 11 is a top view of FIG. 10.

DESCRIPTION OF THE PREFERRED EMBODIMENT

Figure 1:
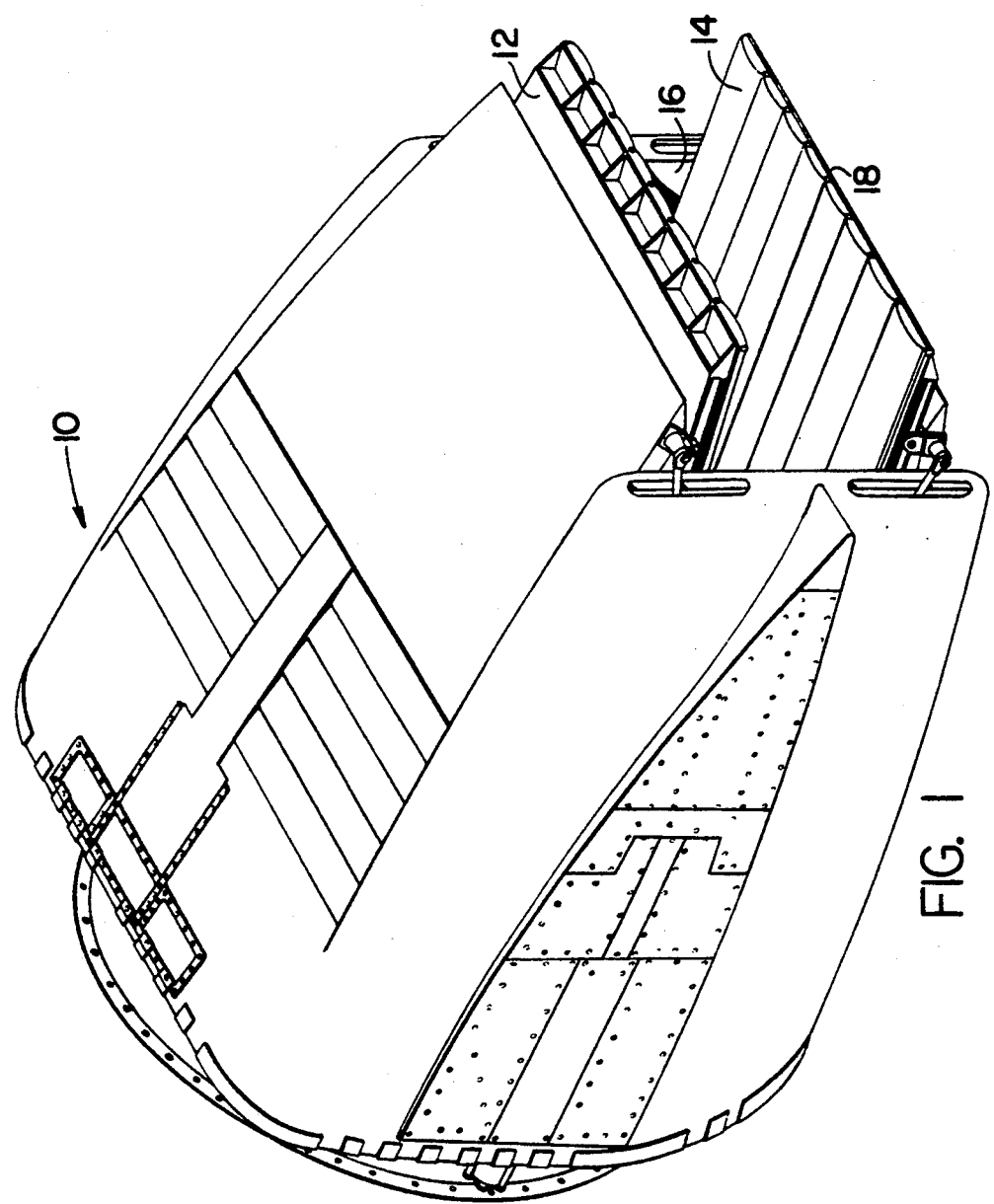
FIG. 1 is an isometric view showing a nozzle flap.

In FIG. 1 there is illustrated a nozzle assembly 10 for a gas turbine engine including an upper moveable flap 12 and a lower moveable flap 14. The flaps may be rotated upwardly or downwardly sealing against sidewall 16. The portion of the nozzle exposed to the hot gases passing therethrough is covered by liner 18 which is supported from honeycomb support structure 20. A coolant plenum 22 is thereby formed beneath liner 18.

Figure 2:
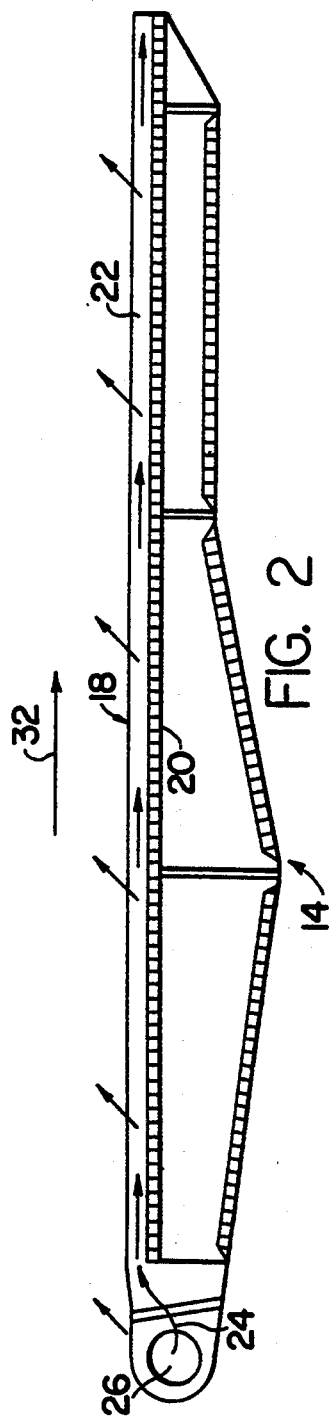
FIG. 2 is a section through a flap showing the general flow of coolant air.
Figure 3:
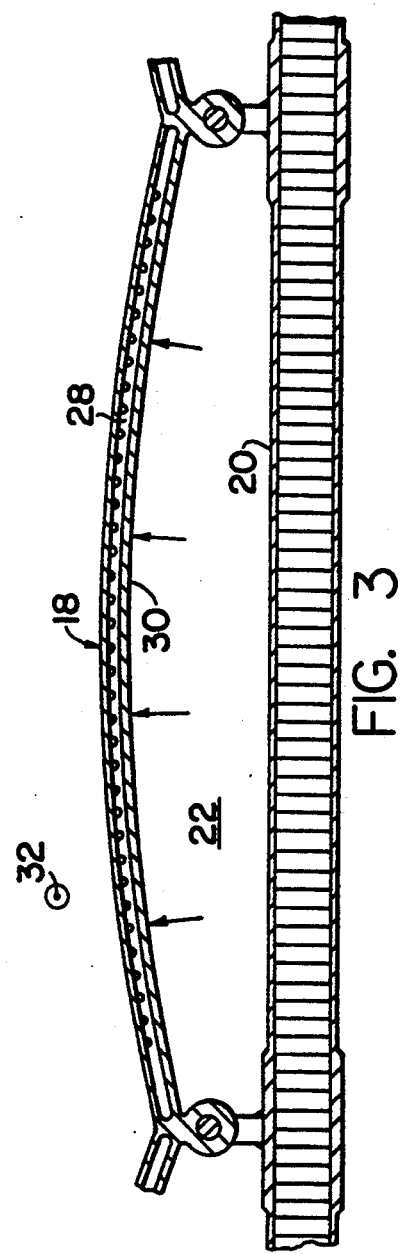
FIG. 3 is a section through the flap looking in the direction of gas flow.

The overall objective of the cooling flow is to locally cool the liner which is exposed to the hot gas. To this end, as shown in FIG. 2, a flow of coolant 24 may enter through pivot pin 26 into the interior of the moveable flap 14, particularly through plenum 22.

An additional coolant plenum 28 is formed between the thin liner 18 and impingement distribution plate 30. Small openings in this distribution plate permit the flow of coolant air into plenum 28 with these openings being selected to provide impingement cooling of the thin liner 18 as desired. It is noted that this is separate from, and in addition to, the impingement to be described later with respect to the individual diffuser openings.

The flow of hot gas 32 passes from upstream to downstream as indicated.

Referring to FIG. 4, the thin liner 18 is formed of two bonded plates with plate 34 being on the hot side exposed to the gas with plate 36 being bonded thereto, but on the cool side. Also illustrated is general distribution plate 30. A plurality of diffuser openings 38 are arranged in checkerboard pattern for introduction of the cooling air through the liner to provide film cooling thereof.

FIGS. 5 through 9 show the details of an individual gas diffuser opening 38. The first metal sheet 34 is 0.04 inches thick and the second metal sheet 36 is 0.01 inches thick. A formed depression 40 in sheet 36 has a downstream wall 42 which is substantially flat and located at an angle 44 of 24 degrees with respect to the plane of first metal sheet 34. This angle is preferably between 10 degrees and 30 degrees from the plane of the first sheet.

The first sheet 34 has a trapezoidal opening 46 therein. Sheet 34 has an overlaying sheet portion 48 at the upstream side of the opening which overlays the upstream portion 50 of the depression. This overlaying portion 48 also overlays the upstream portion of the downstream wall 42. A chamber 52 is thereby formed being bounded by the surfaces of the upstream portion 50 of the depression, the overlaying sheet 48, and the downstream wall 42.

The depression has a metering hole 56 of 0.26 inches in diameter arranged to impinge coolant flow against the overlaying sheet portion 48 of the first sheet. These metering holes stabilize the flow distribution to the various diffuser openings, which flow could tend to vary because of local pressure deviations in the hot gas flow.

Incoming coolant low temperature gas impinges against sheet 48, cooling the sheet locally, and also causing the gas to spread out and pass in a substantially uniform velocity manner through slot or restricted opening 58. This opening 58 is the minimum opening between the overlaying sheet portion 48 and the downstream wall 42. The flow area of this opening is 0.00086 square inches compared to the flow area of 0.00053 square inches of the metering hole. Thus, the velocity of the coolant is reduced as it passes toward the gas stream and it is substantially uniformly distributed across the opening. The flow area of this opening 58 is greater than the flow area of the metering hole, but should not exceed 7 times the metering hole area. Such excess area would result in too low an incoming velocity.

FIG. 8 illustrates the flow area 52 just at the edge of the overlaying plate 34, while FIG. 9 illustrates the location of the downstream wall 42 at a location where the opening 46 is overlaying the downstream wall. Hypothetical extension 60 of the downstream wall is arranged to clear the upstream edge 62 of the first plate 34 at the downstream end of trapezoidal 46. The forming of depression 40 with the relatively flat surface 42 results in a pair of bent lines 64 substantially defining the outer edge of the downstream wall 42. These bend lines are at an angle 66 of 25 degrees with respect to the line 68.

FIGS. 10 and 11 illustrate an alternate embodiment where the overlaying sheet portion 48 of first sheet 34 is bent downwardly into chamber 50 forming a cantilevered section 70. An impingement opening 72 is located to impinge against this overlaying portion 70. This also provides for the diffusion of the incoming air so that it moves in substantially parallel flow lines at relatively low velocity through opening 74.

The relatively high velocity of the incoming meter airflow is reduced in an area where it is surrounded by bounding surfaces. Accordingly the flow is decreased and diffused without the ingestion of hot gas from the main gas stream which is otherwise caused by low static pressures in the jet.

While the diffuser openings in U.S. Pat. No. 4,773,593 were found to result in a 10 percent improvement in the cooling effectiveness as compared to the prior art diagonal holes, tests have shown that the diffusers of this invention result in a 55 percent improvement.

I claim:
1. A cooled liner for a hot gas conveying conduit comprising:
   a first metal sheet in contact with hot gas flowing from upstream to downstream;
   a second metal sheet in contact with said first metal sheet and exposed to a supply of cool gas;
   a plurality of gas diffusion openings through said first and second sheets, each of said diffusion openings comprising,
   a formed depression in said second metal sheet away from said first metal sheet forming a chamber between said second metal sheet and the plane of said first metal sheet, and forming a downstream wall of said depression at an angle between 10 degrees and 30 degrees from the plane of said first sheet,
   said second sheet continuing in contact with said first sheet downstream of said depression,
   an opening in said first sheet in registration with the downstream wall of said depression, but with said first sheet overlaying an upstream portion of said chamber, whereby said depression plus the overlaying portion of said first sheet form bounding surfaces of said chamber, and
   a metering hole in said formed depression at a location to impinge cool gas passing therethrough against a bounding surface other than said downstream wall.

2. A liner as in claim 1:
said overlaying portion overlaying an upstream portion of said downstream wall.

3. A liner as in claim 2:
the minimum flow area between said overlaying portion and said downstream wall being greater than the flow area of said metering hole.

4. A liner as in claim 3:
the flow area between said overlaying portion and said downstream wall being less than 7 times the flow area of said metering hole.

5. A liner as in claim 4:
the opening in said first sheet being located such that an edge of said first sheet downstream of said hole is clear of a hypothetical extension of said downstream wall of said depression.

6. A liner as in claim 5:
said metering hole located to impinge cool gas passing therethrough substantially on a center line of said diffusion opening, said center line being parallel to the hot gas flow.

7. A liner as in claim 5:
said metering hole located to impinge cool gas passing therethrough against said overlaying portion of said first metal sheet.

8. A liner as in claim 5:
said depression having a bend line between said downstream wall and side walls;
said bend line being at an angle between 20 and 30 degrees from the center line through said depression.

9. A liner as in claim 5:
the opening in said first sheet being of trapezoidal shape with the wide portion at the downstream end of said opening.

10. A liner as in claim 1:
said plurality of gas diffusion openings being arranged in checkerboard pattern.

11. A liner as in claim 1:

said overlaying portion of said first metal sheet having a downstream end thereof bent downwardly within said chamber; and said metering hole located to impinge cool gas passing therethrough against said downwardly bent portion.

12. A liner as in claim 1:

the minimum flow area between said overlaying portion and said downstream wall being greater than the flow area of said metering hole.

13. A liner as in claim 12:

the flow area between said overlaying portion and said downstream wall being less than 7 times the flow area of said metering hole.

14. A liner as in claim 1:

the opening in said first sheet being located such that an edge of said first sheet downstream of said hole is clear of a hypothetical extension of said downstream wall of said depression.

15. A liner as in claim 5:

said metering hole located to impinge cool gas passing therethrough substantially on a center line of said diffusion opening against said overlaying portion of said first metal sheet; and said depression having a bend line between said downstream wall and side walls;

said bend line being at an angle between 20 and 30 degrees from the center line through said depression.

16. A liner as in claim 15:

the opening in said first sheet being of trapezoidal shape with the wide portion at the downstream end of said opening.

17. A liner as in claim 3:

said plurality of gas diffusion openings being arranged in checkerboard pattern.

18. A liner as in claim 3:

said overlaying portion of said first metal sheet having a downstream end thereof bent downwardly within said chamber; and said metering hole located to impinge cool gas passing therethrough against said downwardly bent portion.

19. A liner as in claim 5:

said plurality of gas diffusion openings being arranged in checkerboard pattern.

20. A liner as in claim 11:

said plurality of gas diffusion openings being arranged in checkerboard pattern.

* * * * *